(12) United States Patent
Watanabe

(10) Patent No.: US 6,559,957 B1
(45) Date of Patent: *May 6, 2003

(54) DISCRIMINATING A RULE FOR PROCESSING DATA

(75) Inventor: Yoko Watanabe, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/688,225

(22) Filed: Jul. 29, 1996

Related U.S. Application Data

(63) Continuation of application No. 08/096,925, filed on Jul. 23, 1993, now abandoned.

(30) Foreign Application Priority Data

Jul. 23, 1992 (JP) ............................................. 4-196760

(51) Int. Cl.⁷ ............................................. G06K 15/00
(52) U.S. Cl. ..................................... 358/1.13; 358/1.15
(58) Field of Search ............................... 395/114, 112, 395/113, 107, 101, 500, 385, 527, 500.44–500.49; 358/435, 436, 437; 347/50; 712/209

(56) References Cited

U.S. PATENT DOCUMENTS

| | | | | |
|---|---|---|---|---|
| 4,633,274 A | * | 12/1986 | Matsuda | 347/50 |
| 5,075,874 A | * | 12/1991 | Steeves et al. | 395/112 |
| 5,140,675 A | * | 8/1992 | Okada | 395/114 |
| 5,165,014 A | * | 11/1992 | Vassar | 395/112 |
| 5,303,336 A | * | 4/1994 | Kageyama et al. | 395/114 |
| 5,327,525 A | * | 7/1994 | Matsushima | 395/114 |
| 5,668,936 A | | 9/1997 | Motooka et al. | 358/1.15 |
| 6,081,663 A | | 6/2000 | Takahashi et al. | 395/500.41 |

FOREIGN PATENT DOCUMENTS

| | | |
|---|---|---|
| EP | 0478965 | 4/1992 |
| EP | 0503902 | 9/1992 |
| GB | 2219114 | 11/1989 |
| GB | 2251711 | 7/1992 |
| JP | 4-5742 | 1/1992 |
| JP | 4-12876 | 1/1992 |
| JP | 4-148430 | 5/1992 |
| JP | 4-189154 | 7/1992 |
| JP | 4-239314 | 8/1992 |
| JP | 5-88822 | 4/1993 |
| JP | 5-169736 | 7/1993 |
| JP | 5-338329 | 12/1993 |
| WO | WO 9012359 | 10/1990 |

* cited by examiner

Primary Examiner—Gabriel Garcia
(74) Attorney, Agent, or Firm—Fitzpatrick, Cella, Harper & Scinto

(57) ABSTRACT

An output method and apparatus of a printer are provided. A rule which dominates a describing language of reception data is judged and stored. The reception data is processed in accordance with the rule determined. The data which is received before the elapse of a predetermined time after the reception data was processed is processed in accordance with the rule decided. With respect to the data which is received after the elapse of the predetermined time, a rule which dominates such data is newly discriminated. The content of the description of the reception data is discriminated and the resolution of the printer is changed in accordance with the resolution of the image data indicated by the reception data.

39 Claims, 11 Drawing Sheets

DISCRIMINATING A RULE FOR PROCESSING DATA

This application is a continuation of application Ser. No. 08/096,925, filed Jul. 23, 1993, now abandoned.

BACKGROUND OF THE INVENTION

1. Field of the Invention

The present invention relates to an output method and apparatus for receiving data such as a control language or the like from, for example, a host computer or the like and for outputting data.

2. Description of the Related Art

In a conventional output apparatus, for example, in a printing apparatus, the apparatus is set into an automatic switching allowable state such that when data is received and analyzed and processed, whether data which will be received next relates to which control language is judged and a processing mode can be switched to the process according to the control language.

In the above conventional apparatus, however, there is a problem such that in the case where a long time interval exists between the data while a series of data is received from a host computer as in the case where an amount of data which is transmitted from the host computer is large or the like, the printing apparatus determines that the data to be received ends, so that the processing mode is returned to the automatic switching mode and the data subsequent to the previously received data is not correctly analyzed but is abnormally outputted. On the other hand, since the switching operation is executed each time the reception of data is stopped, there is a case where a processing time becomes slow.

SUMMARY OF THE INVENTION

The invention is made in consideration of the above conventional apparatus and it is an object of the invention to provide an output method and apparatus in which even when data to be received is stopped, data which is subsequently received can be accurately rapidly processed.

Another object of the invention is to provide an output method and apparatus comprising: a discriminating step of discriminating a rule which dominates a description of reception data and storing the result of the discrimination; and a processing step of processing the reception data in accordance with the rule decided by the discriminating step, wherein after the reception data was processed by the processing step, the data received before the elapse of a predetermined time is processed in accordance with the result of the discrimination stored by the discriminating step, and with respect to the data received after the elapse of the predetermined time, the rule which dominates such data can be newly discriminated by the discriminating step.

Still another object of the invention is to provide output method and apparatus comprising: receiving means for receiving data; discriminating means for discriminating a rule which dominates a description of such data and storing the result of the discrimination; processing means for processing the data in accordance with the rule decided by the discriminating means, thereby forming image data; measuring means for measuring the elapse of time after the data was processed by the processing means; and output means for outputting the image data formed by the processing means, wherein when the data is received by the receiving means after the time measured by the measuring time elapsed by a predetermined time, the rule of the data is discriminated by the discriminating means, and when the data is received before the elapse of the predetermined time, the discrimination of the rule by the discriminating means is not executed but the received data can be processed by the processing means on the assumption that the received data conforms with the result of the discrimination by the discriminating means just before the data reception.

DETAILED DESCRIPTION OF THE PREFERRED EMBODIMENTS

<Construction>

Figure 1:
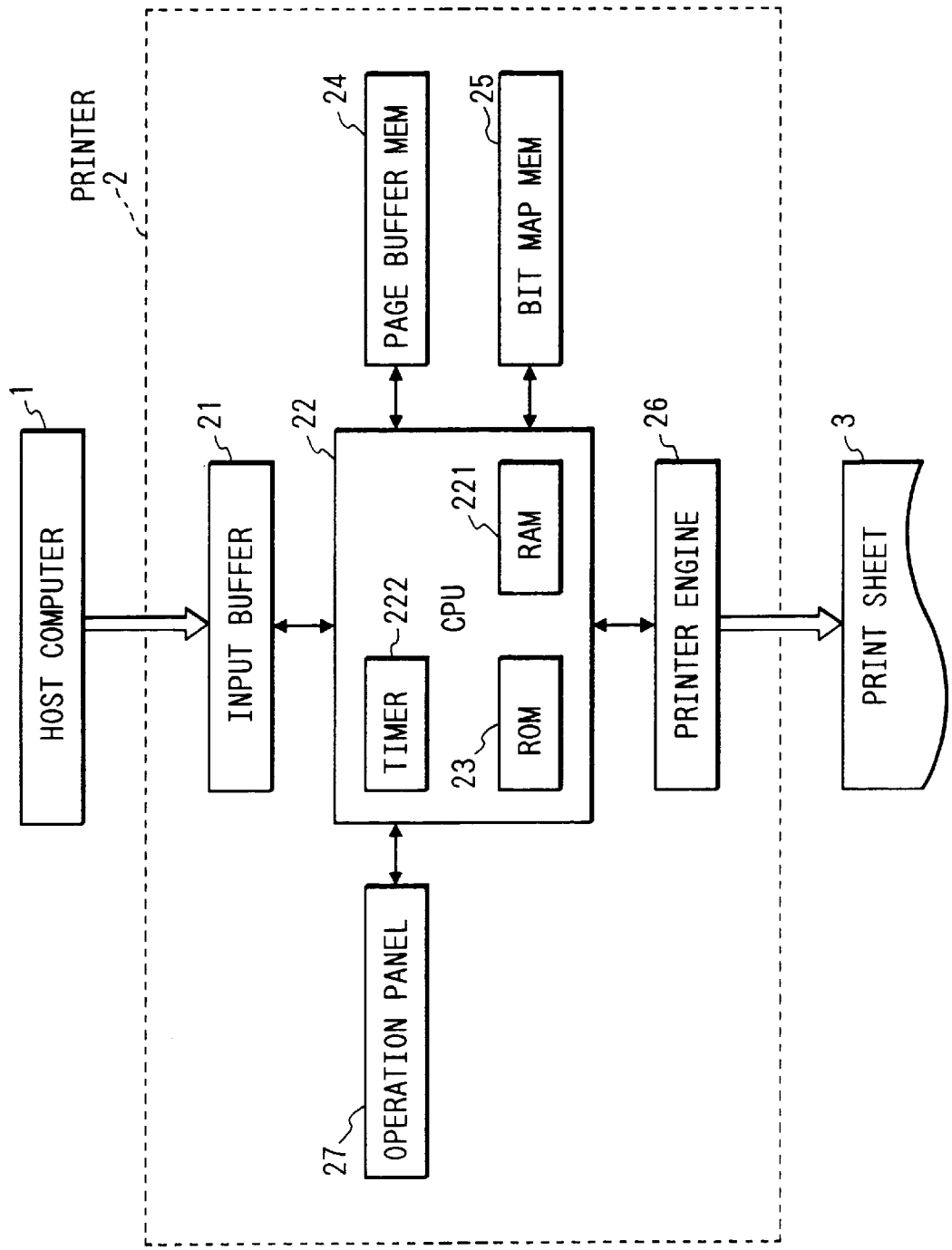
FIG. 1 is a block diagram showing a fundamental construction according to an embodiment.

FIG. 1 is a block diagram showing a construction of a printer system as an example of an output apparatus according to an embodiment.

In the diagram, reference numeral 1 denotes a host computer which generates print information comprising print data and a control code for a printer 2.

In the printer 2, reference numeral 21 denotes an input buffer to store reception data; 22 a CPU to control a printing apparatus; 23 a ROM in which programs for a control code discriminating process for discriminating a control language which describes the received data and for deciding analyzing means, an analyzing process of the control language, and the like have been stored; 24 a page buffer to store the received data for every page; 25 a bit map memory to store output image data of one page; 26 a printer engine to output the image data stored in the bit map memory 25 to a recording paper; and 3 a printed output paper (or print sheet). A RAM 221 is used as a work memory or the like of the CPU. A timer 222 is used by the CPU 22. An operation panel 27 is constructed by a keyboard and switches to directly give an instruction to the printer by the operator, a display panel, and the like.

Figure 2:
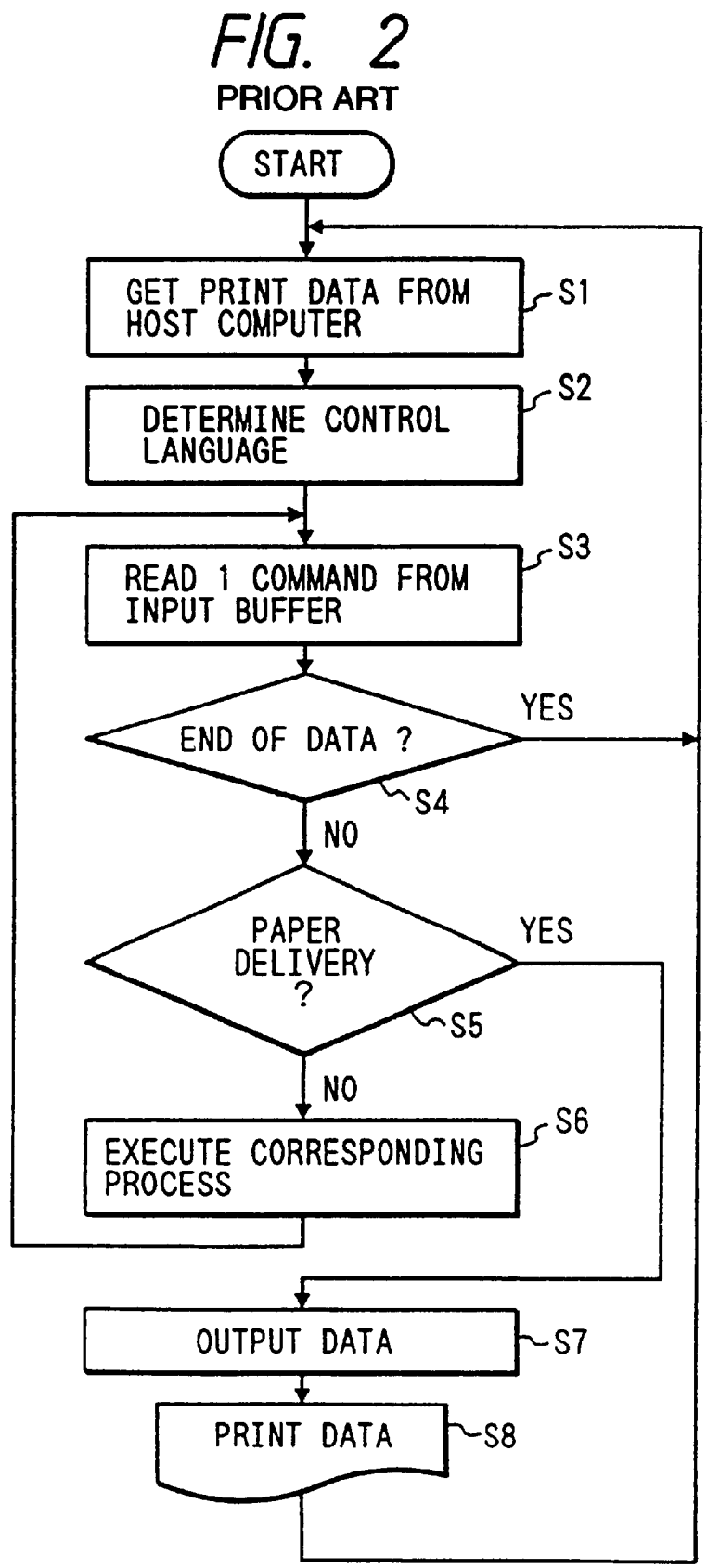
FIG. 2 is a flowchart showing processings of a conventional program.

FIG. 2 is a flowchart showing a procedure of a conventional output processing program stored in the ROM 23 and will be sequentially explained from step 1.

When no data is received, the printing apparatus is set in an automatic switching allowable state. When data is received from the host computer (step S1), the control language which describes the data is decided in accordance with the data content and a special control language is analyzed from the automatic switching allowable state in accordance with the result of the decision (step S2). In this case, as a ground of the decision, a method of deciding the control language by an identifier of the control language associated with the data or the like is considered. Hereinafter, the control language which describes the data is determined and a state in which the control language which should be analyzed has been determined is called an analysis processing state.

After that, control commands are read one by one from the input buffer (step S3). The command is analyzed and processed (steps S4, S5, S6). When no data exists in the input buffer (step S4), the processing routine is returned to the automatic switching allowable state. When the command read out from the input buffer is a command accompanied with a paper delivery process (step S5), output image data is formed in the bit map memory 25 (step S7). A printing process is performed and the processing routine is returned to the automatic switching allowable state (step S8).

Figure 3:
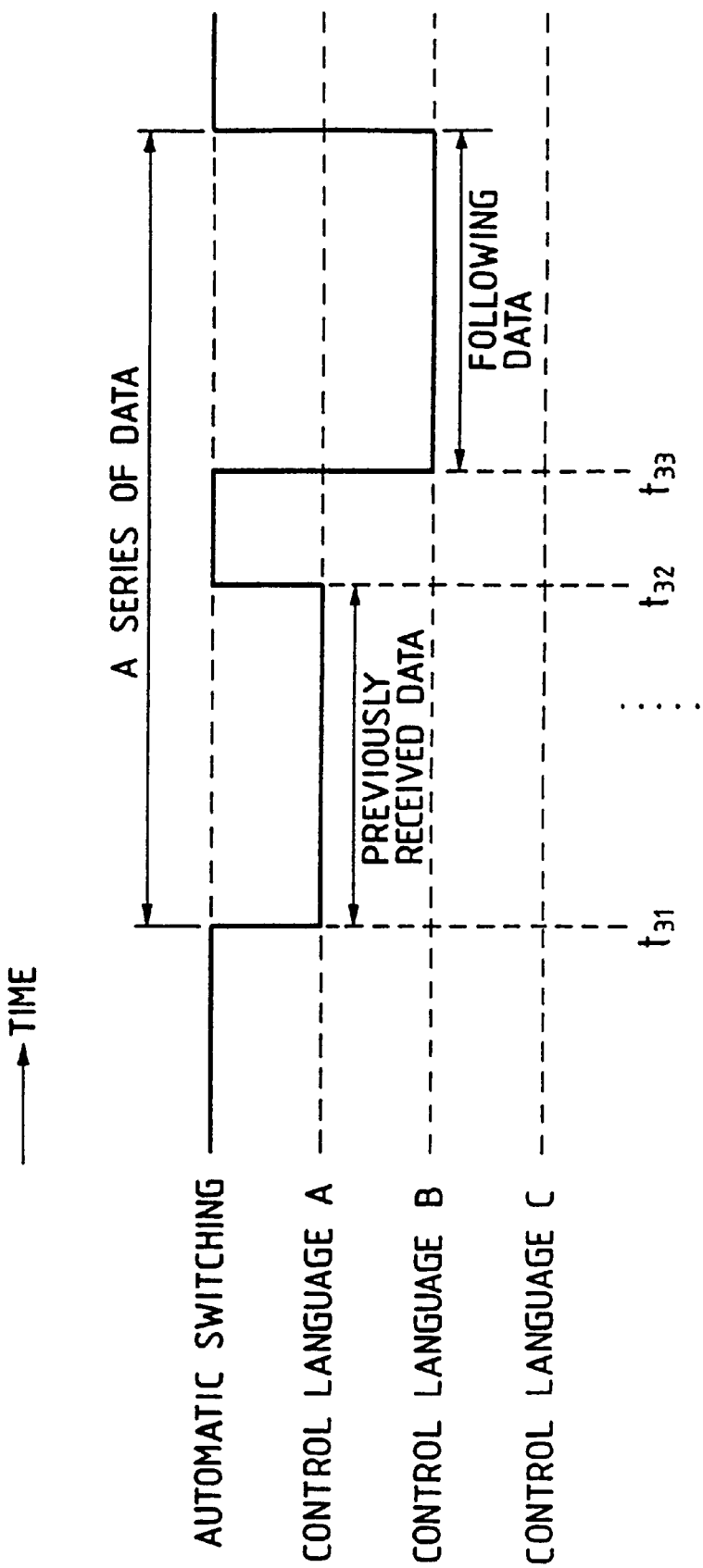
FIG. 3 is a diagram for explaining a transition of a state in a conventional printer.

FIG. 3 shows a state of the status transition according to the conventional method described above.

That is, at timing $t_{31}$, it is determined that the data which has been received for the first time from the automatic switching allowable state indicates the control language A, so that the data is processed. At timing $t_{32}$, the reception of the data is stopped (step S4 in FIG. 2), so that the processing routine is returned to the automatic switching allowable state. When the subsequent data is received at timing $t_{33}$, the control language which describes the data is again decided. In this instance, however, it is judged such that the data has been described by the control language B instead of the control language A. Such an example is shown in FIG. 3. Therefore, since the data to be inherently processed as a control language A is processed as a control language B, the output result is quite different from the result which was inherently expected.

<Output Processing Procedure>

A processing procedure according to the embodiment will now be described.

Figure 4:
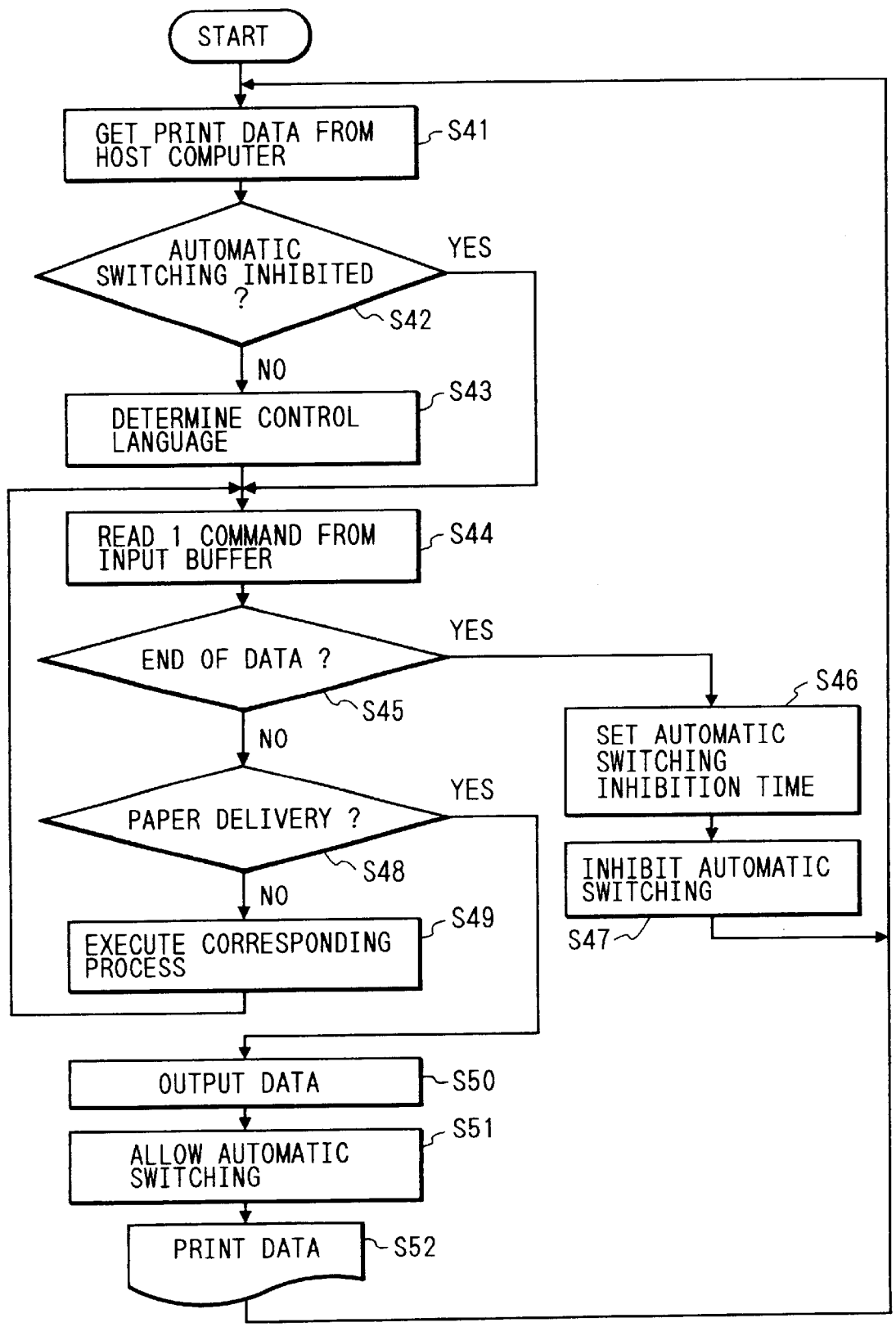
FIG. 4 is a flowchart showing processes of a program according to the embodiment.

FIG. 4 is a flowchart showing a processing procedure by a program of the embodiment which is stored in the ROM 23. The processing procedure is executed by the CPU 22.

When data is received from the host computer 1 (step S41), a check is made to see if the operating mode is at present set to the automatic switching allowable state or not (step S42). A flag indicative of the automatic switching allowable state or the like has previously been stored in the RAM 221 and such a discrimination is made on the basis of the value of such a flag.

If NO in step S42, the rule which dominates the description of the reception data, namely, the data describing language is discriminated, the analyzing procedure suitable to the rule, i.e., describing language is decided, and the analysis processing state is started (step S43). The result is stored into the RAM 221. The data which is received after that is analyzed by the analyzing procedure based on the result which had been decided and was stored. After that, step S44 follows. When the operating mode has already been set into the analysis processing mode, the processing routine skips step S43 and directly advances to step S44.

Subsequently, commands are read out one by one from the input buffer (step S44). The end of data is judged (step S45). The presence or absence of a paper delivery processing instruction is checked (step S48). The read command is processed (step S49). When no data exists in the input buffer 21 in step S45, after the end of data, a time to subsequently maintain the analysis processing state is set (step S46). The automatic switching is inhibited (step S47). Such an inhibition can be realized by a method whereby a time is set into the timer 222 and when the time is over, the time-over is informed from the timer to the CPU by an interruption or the like. The time which is set into the timer is not limited to the timing at which no data exists in the input buffer 21 but can be also set to the timing when the reception of data from the host computer 1 is stopped.

Figure 6:
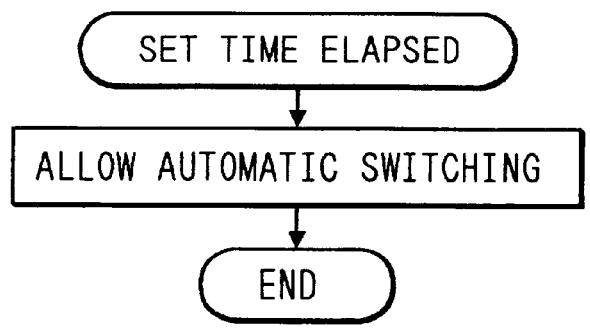
FIG. 6 is a flowchart showing processes of a program according to the embodiment.

When the data is received from the host computer in the analysis processing mode, it is regarded that the same data as that of the control language which had been processed just before was received, so that the analyzing process is executed. On the other hand, when the set time elapses, an interruption signal or the like by the timer 222 is used as a trigger and a processing procedure shown in a flowchart of FIG. 6 is executed. The automatic switching state is started.

When the command read out from the input buffer is a command accompanied with the paper delivery process in step S48, an outputting process is executed and the data in the bit map memory 25 is formed as a visible image on the recording paper (step S50). The processing routine is returned to the automatic switching allowable state (step S51). The image data is output to the print paper (step S52).

Figure 5:
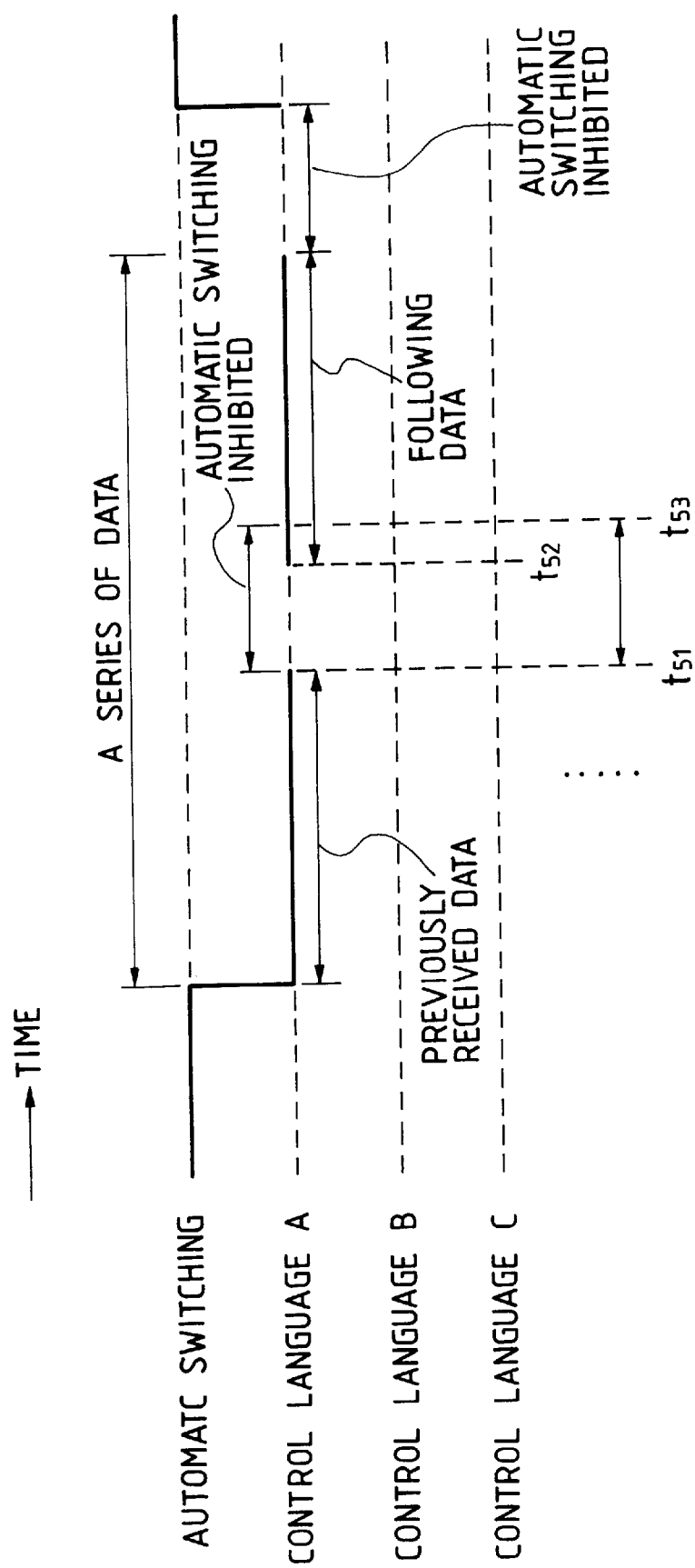
FIG. 5 is a diagram for explaining a transition of a state in a printer of the embodiment.

FIG. 5 shows an example of the method of the embodiment. That is, it is determined that the data which was received for the first time is described by the control language A, and the data is processed. Although the data reception is stopped at timing $t_{51}$, since the procedure of the data has been received at timing $t_{52}$ before timing $t_{53}$ at which the analysis processing state which was set at that time is maintained, it is regarded that the data is described by the control language A, and the analyzing process is executed.

A laser beam system can be also used as an image forming mechanism of the printer according to the embodiment.

Figure 7:
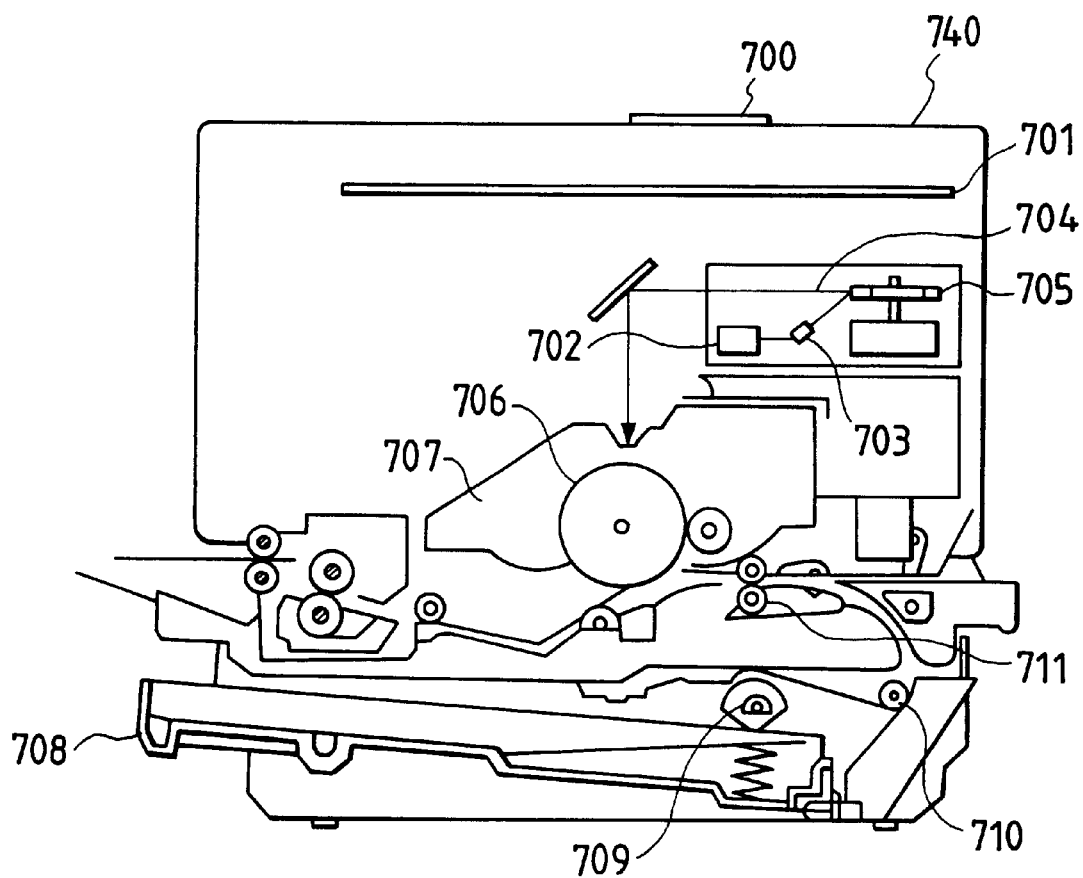
FIG. 7 is a cross sectional view of a laser beam printer.

FIG. 7 is a cross sectional view showing an internal structure of a laser beam printer (hereinafter, abbreviated to an LBP) in this case. The LBP can receive character pattern data or the like and can print the data onto a recording paper.

In the diagram, reference numeral 740 denotes an LBP main body to form an image onto a recording paper as a recording medium on the basis of the character pattern or the like which is supplied; 700 an operation panel on which switches for operations, an LBP display, and the like are arranged; and 701 a printer control unit to control the whole LBP 740 and to analyze the character pattern information or the like. The printer control unit 701 mainly converts the character pattern information into the video signal and supplies the video signal to a laser driver 702.

The laser driver 702 is a circuit to drive a semiconductor laser 703 and on/off switches a laser beam 704 which is emitted from the semiconductor laser 703 in accordance with the inputted video signal. The laser beam 704 is swung to the right and left by a rotary polygon mirror 705 and scans on an electrostatic drum 706. Thus, an electrostatic latent image of the character pattern is formed on the drum 706. The latent image is developed by a developing unit 707 arranged around the drum 706 and a copy is transferred to the recording paper after that. Cut sheets are used as recording papers. The cut sheet recording papers are enclosed in a sheet cassette 708 set in the LBP main body 740 and are picked up and conveyed into the apparatus by a paper feed roller 709 and conveying rollers 710 and 711 and fed to the drum 706.

As an image forming apparatus of the embodiment, the invention can be also applied to an ink jet printer, which will be explained hereinafter, or the like.

<Schematic Description of Apparatus Main Body>

Figure 8:
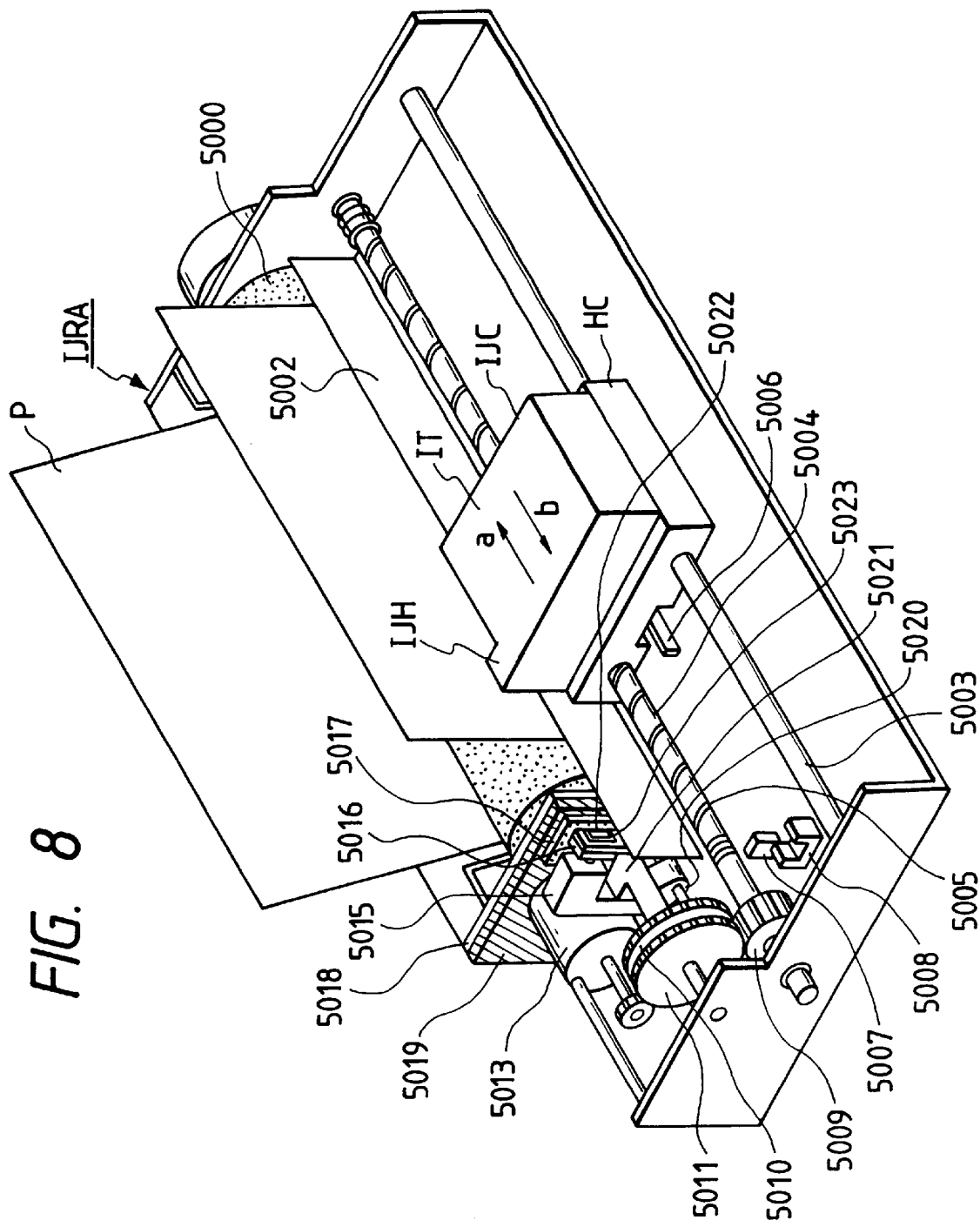
FIG. 8 is a perspective view of an ink jet printer.

FIG. 8 is a schematic external view of an ink jet recording apparatus IJRA to which the invention can be applied. In the diagram, a lead screw 5005 is rotated in association with the forward/reverse rotation of a driving motor 5013 through driving force transfer gears 5011 and 5009. A carriage HC has a pin (not shown) which comes into engagement with a spiral groove 5004 of the lead screw 5005. The carriage HC is reciprocated in the directions of arrows a and b. An ink jet cartridge IJC is mounted on the carriage HC. Reference numeral 5002 denotes a paper pressing plate to press the paper onto a platen 5000 in the moving direction of the carriage; and 5007 and 5008 photocouplers serving as home position detecting means for detecting the presence of a lever 5006 of the carriage HC in a region of the photocouplers and for performing the switching of the rotating direction of the motor 5013 or the like. Reference numeral 5016 denotes a member to support a capping member 5022 to cap the front surface of a recording head; and 5015 sucking means for sucking the air in the cap. The sucking means performs a sucking recovery of the recording head through an opening 5023 in the cap. Reference numeral 5017 denotes a cleaning blade and 5019 a member for enabling the cleaning blade to be moved in the front/back direction. The cleaning blade 5017 and the member 5019 are supported to a main body supporting plate 5018. The cleaning blade is not limited to the shape shown in the diagram but a well-known cleaning blade can be also obviously applied. Reference numeral 5021 denotes a lever to start the sucking operation in the sucking recovery. The lever 5021 is moved in association with the movement of a cam 5020 which is come into engagement with the carriage. A driving force from the driving motor is transferred and controlled by well-known transfer means such as clutch switching or the like.

A desired one of the processes such as capping, cleaning, and sucking recovery can be executed at the corresponding positions by the operation of the lead screw 5005 when the carriage reaches the region of the home position side. The embodiment can be also applied to any apparatus so long as a desired operation is executed at a well-known timing.

<Description of Control Construction>

Figure 9:
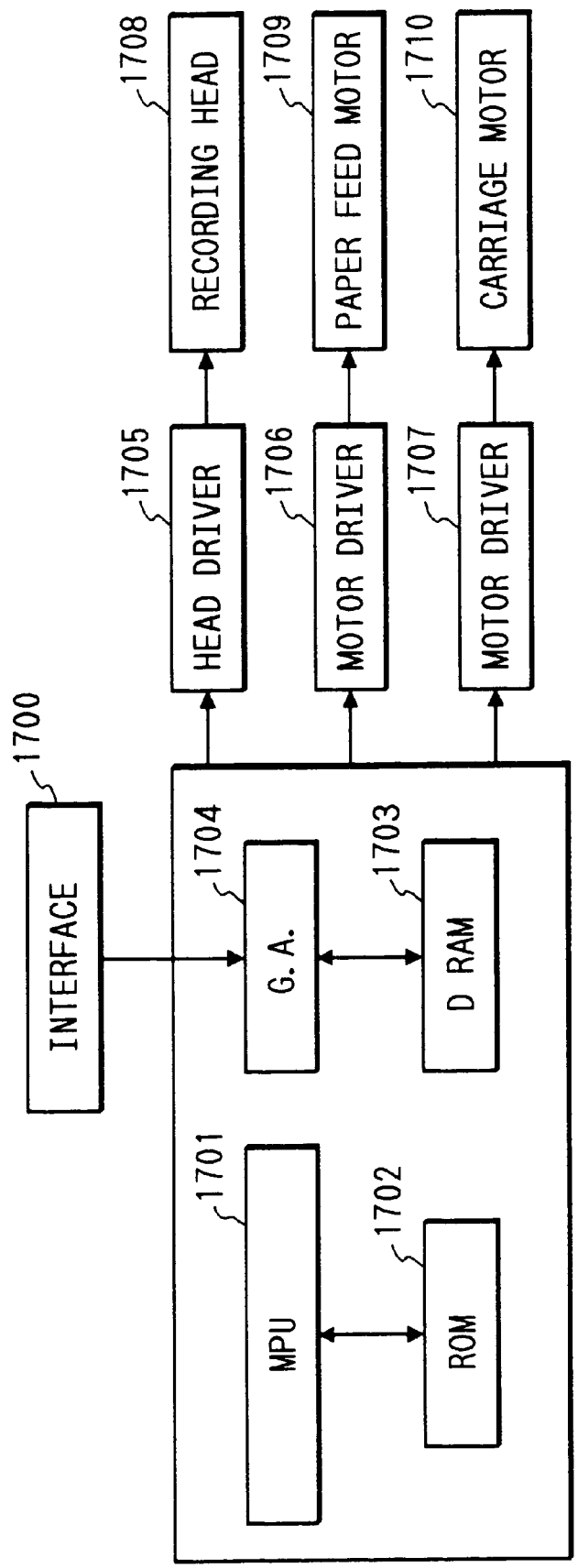
FIG. 9 is a block constructional diagram of the ink jet printer.

A control construction to execute the recording control of the above-mentioned apparatus will now be described with reference to a block diagram shown in FIG. 9. In the diagram showing a control circuit, reference numeral 1700 denotes an interface to input a recording signal; 1701 an MPU; 1702 a program ROM to store control programs which are executed by the MPU 1701; 1703 a dynamic RAM to preserve various kinds of data (the above recording signal, recording data which is supplied to the head, and the like); and 1704 a gate array to control the supply of the recording data to a recording head 1708. The gate array also controls the data transfer among the interface 1700, the MPU 1701, and the RAM 1703. Reference numeral 1710 denotes a carriage motor to convey the recording head 1708; 1709 a conveying motor to convey the recording paper; 1705 a head driver to drive the head; 1706 a motor driver to drive the conveying motor 1709; and 1707 a motor driver to drive the carriage motor 1710.

The operation of the above control construction will now be described. When a recording signal is supplied to the interface 1700, the recording signal is converted into the recording data for printing between the gate array 1704 and the MPU 1701. The motor drivers 1706 and 1707 are driven and the recording head is driven in accordance with the recording data sent to the head driver 1705, thereby printing.

In case of the embodiment, the apparatus has a plurality of kinds of recording heads 1708 and head drivers 1705 in accordance with a resolution and need to be properly switched. Or, a dot diameter can be also changed by the head driver.

The component elements of the invention can be assembled into the control construction of the ink jet printer as mentioned above. The invention is not limited to the laser beam printer but can be also obviously applied to the above ink jet printer or the like.

As mentioned above, even in the case where the transmission of data is stopped during the processing operation when an amount of data to be printed is large or the like, the printer side is in a standby mode while expecting the input of the subsequent data for a predetermined period of time. Therefore, the data which is received later can be accurately processed. The processing time can be reduced by eliminating the main switching operation.

In the embodiment, the time to maintain the analysis processing state has been preset. However, such a maintaining time can be also set to an arbitrary time by a command from the host computer 1 or by an instruction which is inputted from the operation panel 27 by the operator.

It is also possible to construct in a manner such that when the host computer 1 connected to the printer 2 transmits a series of data, the time at which the signal transmission is stopped during the processing operation is measured and stored, and the time to maintain the analysis processing state can be also automatically set to a proper value on the basis of the stored time.

The invention can be applied to a system comprising a plurality of apparatuses or an apparatus comprising one apparatus. The invention can be also obviously applied to the case where it is accomplished by supplying a program to the system or apparatus.

[Another Embodiment]

In the conventional printing apparatus, when image data is generated, in the case where the resolution on the data side differs from the resolution on the printing apparatus side, by processing the data by calculations, the resolution of the image data is made coincident with the resolution of the printing apparatus and the image is printed after that.

In case of printing a large amount of images, however, there is a problem such that it takes a very long time to execute the working process of the data.

In another embodiment, in order to make the resolution of the received image data coincide with the resolution of the printer, the received data is not changed but the resolution is switched on the printing apparatus side and the image data is outputted, thereby realizing a high print processing speed.

<Construction>

Figure 10:
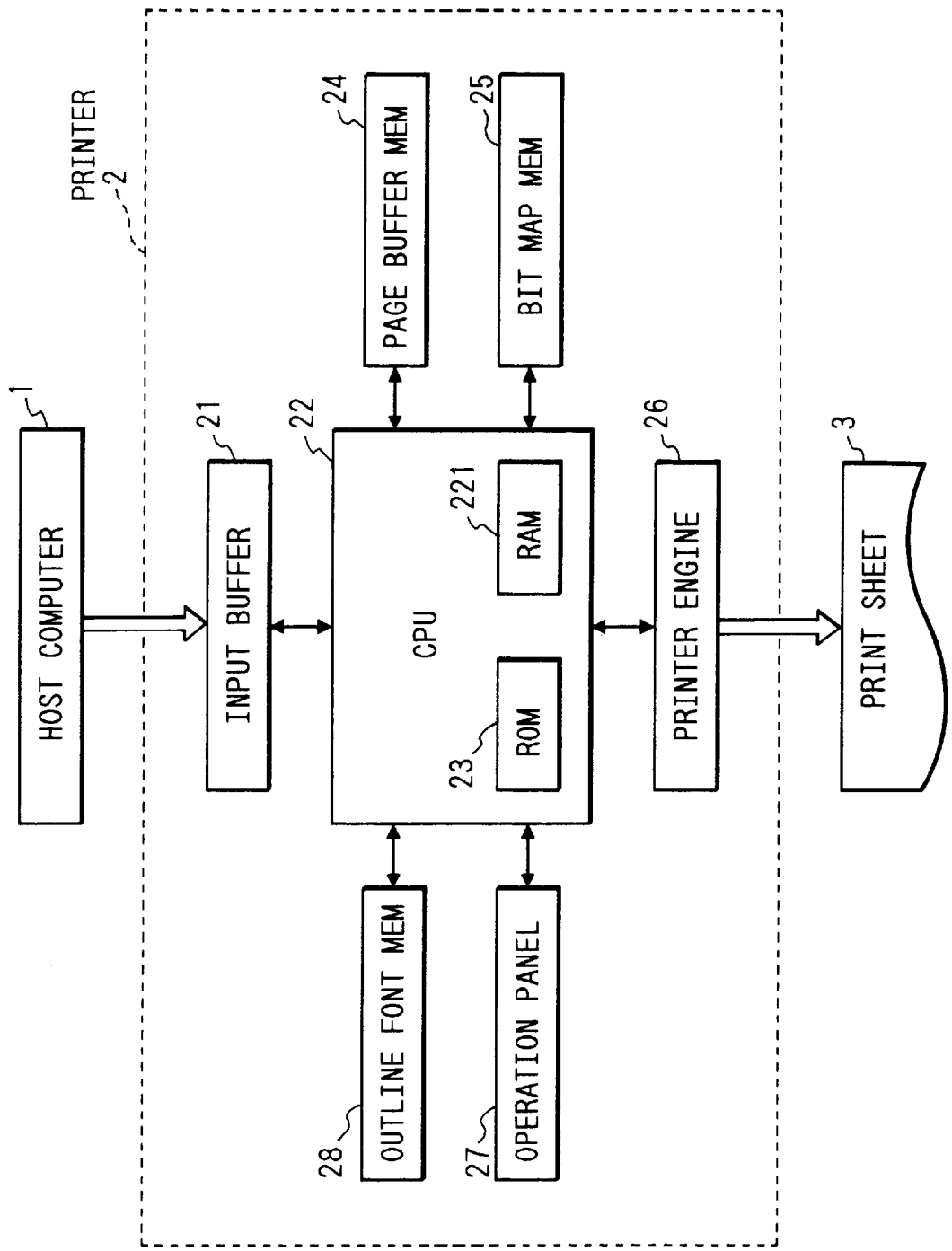
FIG. 10 is a block diagram showing a fundamental construction according to another embodiment.

FIG. 10 is a block diagram showing a construction of a printer system according to the embodiment.

In the diagram, reference numeral 1 denotes the host computer which supplies print information comprising print data and control codes to the printer 2.

In the printer 2, reference numeral 21 denotes the buffer to store reception data; 22 the CPU to control the printing apparatus; 23 the ROM in which programs for a control code discriminating process for discriminating the control language which describes the received data and for deciding analyzing means, an analyzing process of the control language, and the like have been stored; 24 the page buffer to store the received data every page; 25 the bit map memory to store the output image data of one page; and 26 the printer engine to supply the image data stored in the bit map memory 25 to the recording paper. A resolution in the recording can be switched. Reference numeral 3 denotes the printed output paper (also referred to as a print sheet). Pattern data which is produced from the code data has been stored in an outline font memory 28. The RAM 221 is used as a work area or the like of the CPU. The operation panel 27 is constructed by a keyboard and switches to directly give an instruction to the printer by the operator, a display panel, and the like.

Figure 11:
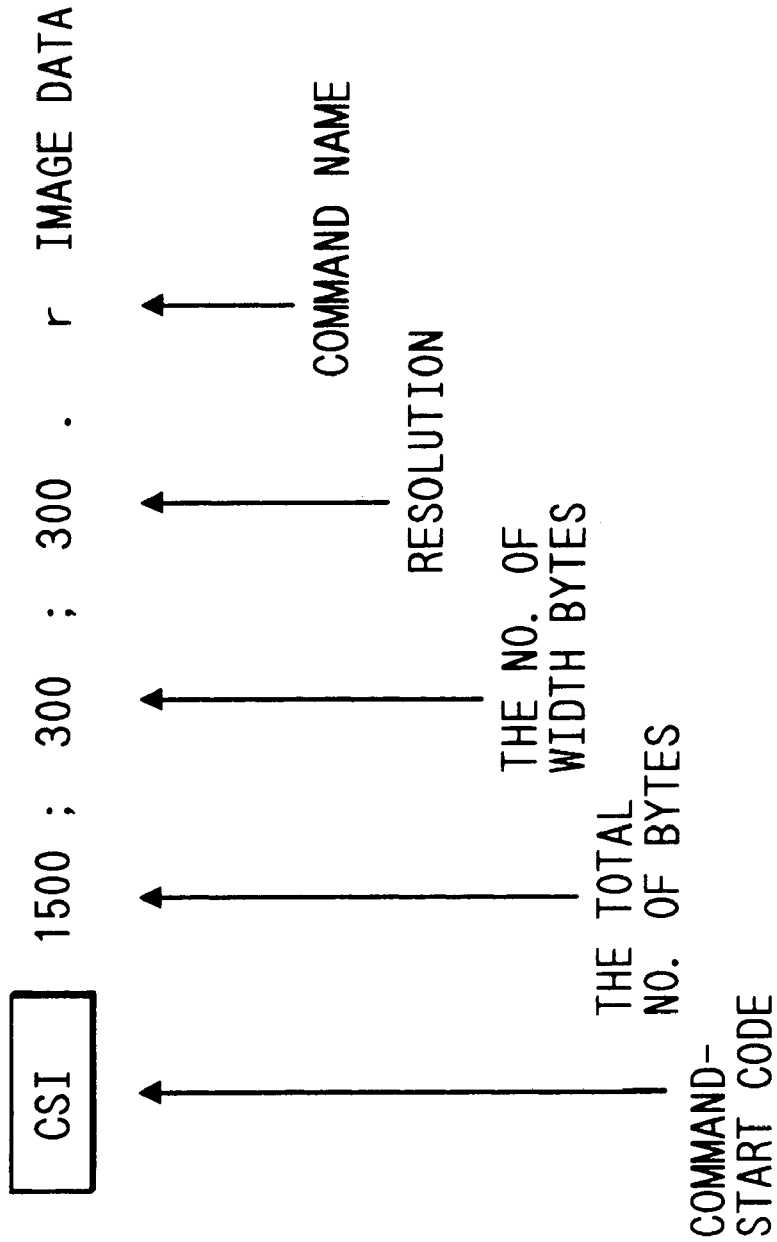
FIG. 11 is a diagram showing an example of a command to designate a resolution of image data according to another embodiment.

FIG. 11 shows an example of commands to designate the resolution of the image data which is sent from the host computer 1 to the printer 2 in the above construction. As shown in the diagram, a command start code is first arranged. The total number of bytes of the designated image data, the number of width bytes, and the resolution are designated. After that, the command name is subsequently arranged. Further, an image data main body follows. As data which is received by the printer 2, in addition to the image data, there are various kinds of control commands, code data to form a pattern from the font which the printer 2 has, and the like.

Figure 12:
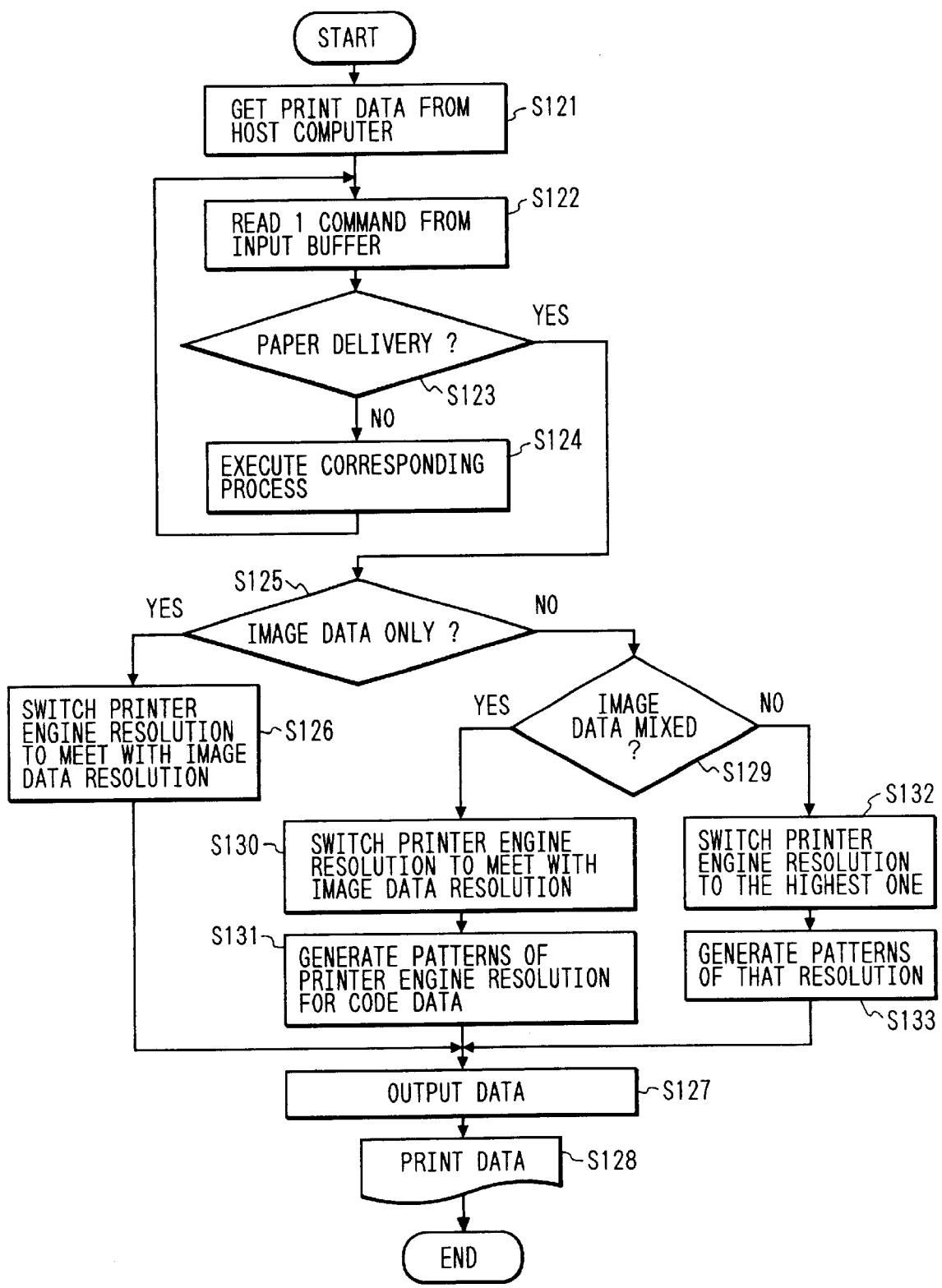
FIG. 12 is a flowchart showing processes of a program according to another embodiment.

FIG. 12 is a flowchart showing a processing procedure by the printer 2 when the image data whose resolution was designated as shown in FIG. 11. The flowchart shows a procedure of the program stored in the ROM 23 and can be realized by being executed by the CPU 22.

In FIG. 12, when the data is first received from the host computer (step S121), it is stored into the input buffer and is read out one by one from the input buffer (step S122). When the command is other than the paper delivery command (step S123), the command is analyzed and the data is analyzed in accordance with the command (step S124).

In the case of the processes accompanied with the paper delivery, a check is made to see if the page is constructed by only the image data or not (step S125). If YES, the resolution of the printer engine 26 is switched so as to be coincident with the resolution of the image data (step S126). After that, the image data is formed in the bit map memory on the basis of the received command and image data (step S127) and is outputted and printed onto the recording paper (step S128).

On the other hand, when it is decided in step S125 that the reception data is not constructed by only the image data, a check is made to see if image data mixedly exists in the reception data or not (step S129). If YES, the resolution of the engine 26 is switched so as to be coincident with the resolution of the image data (step S130), thereby producing the pattern according to the resolution of the printer engine 26 with regard to the code data (step S131).

On the other hand, when the image data does not mixedly exist in the reception data, the resolution of the engine is switched to the highest resolution in order to obtain the print result of the highest quality (step S132), thereby producing the pattern according to such a highest resolution (step S133). The image data is formed in the bit map memory 25 in this manner (step S127) and the image is outputted and printed (step S128).

In many cases, image data is obtained by being read by using an image scanner. However, the resolution of the image scanner is often limited to 300 d.p.i. or 400 d.p.i. Accordingly, it is sufficient that the resolution of the printer 2 corresponds to the resolution according to the image scanner.

It is also possible to construct in a manner such that the resolution is designated by a command that is sent from the host computer 1 or an instruction that is inputted from the operation panel 27 by the operator and, for example, in case of a test print or the like, the image data is generated at a low resolution, thereby realizing a high processing speed.

As described above, in the case where only the image data is sent from the host computer, when the resolution set in the printer differs from the resolution of the received data, by changing the set resolution of the printer in accordance with the resolution of the reception data, there is no need to adjust the resolution of the reception data by executing a thinning-out process or the like. An output processing speed can be raised and the image can be accurately reproduced and outputted at a high fidelity in accordance with the received image. Such a method is particularly effective in the case of using the printer as a dam printer. On the other hand, when no image data exists in the reception data, by forming a pattern at the highest resolution by using an outline font, the output result of a high quality can be obtained.

As described above, the printing method and apparatus according to the invention have an effect such that even when the data to be received is stopped during the processing operation, the data which is subsequently received can be accurately promptly processed.

As shown in another embodiment, on the other hand, an output of a high quality can be obtained at a high speed by making the resolution of the printer coincide with the resolution of the image data sent from the host computer.

What is claimed is:

1. A method of executing printing based on data received via one interface, comprising the steps of:

discriminating a rule under which a description of the received data is controlled;

storing the discriminated rule;

processing the received data according to the stored rule; and controlling (i) said processing step to process data, newly received within a predetermined time from end of processing of previously received data, according to the stored rule, and (ii) said discriminating step to discriminate a new rule for data newly received after the predetermined time, wherein said controlling step allows said discriminating step to discriminate a new rule if the received data comprises a predetermined command.

2. A method according to claim 1, wherein said controlling step controls said processing step to process the newly received data received within the predetermined time after a reception buffer for storing the received data has become empty, according to the stored rule.

3. A method according to claim 1, further comprising the step of inputting the predetermined time.

4. A method according to claim 1, further comprising the steps of:

measuring a time interval from the end of processing of the previously received data until reception of the newly received data; and determining the predetermined time based on the measured time interval.

5. A method according to claim 1, further comprising the step of outputting the received data processed in said processing step for image recording by an electrophotographic recording method.

6. A method according to claim 1, wherein said discriminating step discriminates a control language by which the received data is described.

7. A method according to claim 1, wherein said processing step analyzes the received data and forms image data.

8. A method according to claim 1, further comprising the step of outputting the received data processed in said processing step for image recording with an ink jet recording head.

9. A method according to claim 8, further comprising the step of providing the recording head with a head which ejects an ink drop through thermal energy and which includes a thermal energy conversion element for generating the thermal energy applied to the ink drop.

10. A printing apparatus for executing printing based on data received via one interface, comprising:

discrimination means for discriminating a rule under which a description of the received data is controlled, and storing the discriminated rule, processing means for processing the received data according to the rule stored by said discrimination means;

output means for outputting the data processed by said processing means; and control means for controlling (i) said processing means to process data, newly received within a predetermined time from end of processing of previously received data, according to the stored rule, and (ii) said discrimination means to discriminate a new rule for data newly received after the predetermined time, wherein said control means allows said discrimination means to discriminate a new rule if the data comprises a predetermined command.

11. An apparatus according to claim 10, wherein said control means controls said processing means to process the newly received data received within the predetermined time after a reception buffer for storing the received data has become empty, according to the stored rule.

12. An apparatus according to claim 10, further comprising input means for inputting the predetermined time.

13. An apparatus according to claim 10, further comprising measure means for measuring a time interval from the end of processing of the previously received data until reception of the newly received data; and means for determining the predetermined time based on the measured time interval.

14. An apparatus according to claim 10, wherein said output means outputs the data processed by said processing means by an electrophotographic recording method.

15. An apparatus according to claim 10, wherein said discriminating means discriminates a control language by which the received data is described.

16. An apparatus according to claim 10, wherein said processing means analyzes the received data and forms image data.

17. An apparatus according to claim 10, wherein said output means comprises an ink jet recording head.

18. An apparatus according to claim 11, wherein said output means comprises an ink jet recording head.

19. An apparatus according to claim 12, wherein said output means comprises an ink jet recording head.

20. An apparatus according to claim 13, wherein said output means comprises an ink jet recording head.

21. An apparatus according to claim 17, wherein said recording head comprises a head which ejects an ink drop through thermal energy and which includes a thermal energy conversion element for generating the thermal energy applied to the ink drop.

22. An apparatus according to claim 18, wherein said recording head comprises a head which ejects an ink drop through thermal energy and which includes a thermal energy conversion element for generating the thermal energy applied to the ink drop.

23. An apparatus according to claim 19, wherein said recording head comprises a head which ejects an ink drop through thermal energy and which includes a thermal energy conversion element for generating the thermal energy applied to the ink drop.

24. An apparatus according to claim 20, wherein said recording head comprises a head which ejects an ink drop through thermal energy and which includes a thermal energy conversion element for generating the thermal energy applied to the ink drop.

25. A computer readable medium storing a program for instructing a computer to execute printing based on data received via one interface, comprising:

first program code means for instructing the computer to discriminate a rule under which a description of the received data is controlled, and to store the discriminated rule;

second program code means for instructing the computer to process the received data according to the stored rule; and third program code means for instructing (i) said second program code means to cause the computer to process data, newly received within a predetermined time from end of processing of previously received data, according to the stored rule, and (ii) said first program code means to cause the computer to discriminate a new rule for data newly received after the predetermined time, wherein said third program code means instructs said first program code means to cause the computer to discriminate a new rule if the received data comprises a predetermined command.

26. A computer readable medium according to claim 25, wherein said third program code means controls said second program code means to cause the computer to process the newly received data received within the predetermined time after a reception buffer for storing the received data has become empty, according to the stored rule.

27. A computer readable medium according to claim 25, further comprising fourth program code means for causing the computer to input the predetermined time.

28. A computer readable medium according to claim 25, further comprising fourth program code means for instructing the computer to measure a time interval from the end of processing of the previously received data until reception of the newly received data; and fifth program code means for instructing the computer to determine the predetermined time based on the measured time interval.

29. A computer readable medium according to claim 25, further comprising fourth program code means for instructing the computer to output the received data caused to be processed by said second program code means for image recording by an electrophotographic recording method.

30. A computer readable medium according to claim 25, wherein said first program code means instructs the computer to discriminate a control language by which the received data is described.

31. A computer readable medium according to claim 25, wherein said second program code means causes the computer to analyze the received data and form image data.

32. A computer readable medium according to claim 25, further comprising fourth program code means for instructing the computer to output the received data caused to be processed by said second program code means for image recording with an ink jet recording head.

33. A computer readable medium according to claim 26, further comprising fourth program code means for instructing the computer to output the received data caused to be processed by said second program code means for image recording with an ink jet recording head.

34. A computer readable medium according to claim 27, further comprising fifth program code means for instructing the computer to output the received data caused to be processed by said second program code means for image recording with an ink jet recording head.

35. A computer readable medium according to claim 28, further comprising sixth program code means for instructing the computer to output the received data processed by said second program code means for image recording with an ink jet recording head.

36. A computer readable medium according to claim 32, wherein the recording head comprises a head which ejects an ink drop through thermal energy and which includes a thermal energy conversion element for generating the thermal energy applied to the ink drop.

37. A computer readable medium according to claim 33, wherein the recording head comprises a head which ejects an ink drop through thermal energy and which includes a thermal energy conversion element for generating the thermal energy applied to the ink drop.

38. A computer readable medium according to claim 34, wherein the recording head comprises a head which ejects an ink drop through thermal energy and which includes a thermal energy conversion element for generating the thermal energy applied to the ink drop.

39. A computer readable medium according to claim 35, wherein the recording head comprises a head which ejects an ink drop through thermal energy and which includes a thermal energy conversion element for generating the thermal energy applied to the ink drop.

* * * * *

UNITED STATES PATENT AND TRADEMARK OFFICE
CERTIFICATE OF CORRECTION

PATENT NO.      : 6,559,957 B1                                          Page 1 of 1
DATED           : May 6, 2003
INVENTOR(S)     : Yoko Watanabe It is certified that error appears in the above-identified patent and that said Letters Patent is hereby corrected as shown below:

<u>Column 2,</u>
Line 24, "cross sectional" should read -- cross-sectional --.

<u>Column 4,</u>
Line 36, "cross sectional" should read -- cross-sectional --.

Signed and Sealed this

Eighteenth Day of November, 2003

JAMES E. ROGAN
*Director of the United States Patent and Trademark Office*